Figure 3:
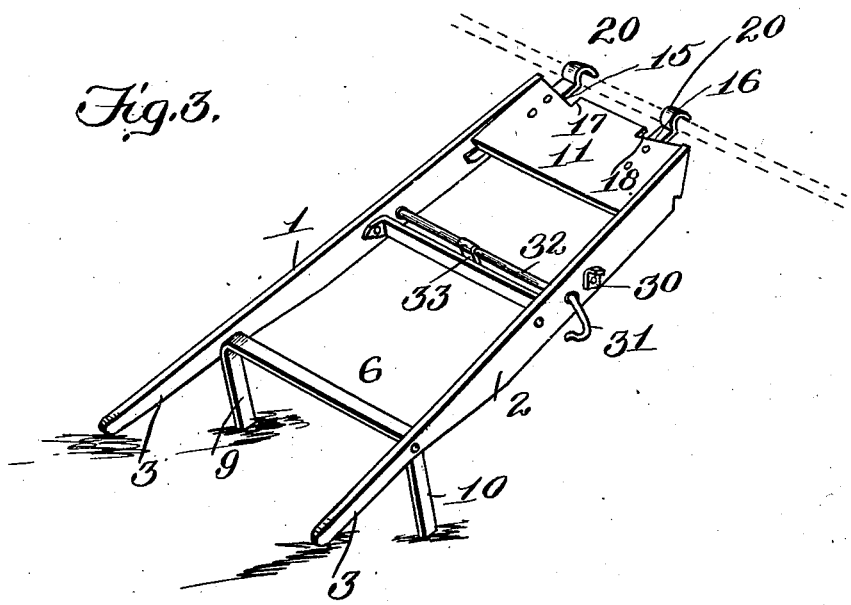

No. 722,570. PATENTED MAR. 10, 1903.
J. E. DILGER.
COMBINED TRUCK AND SKID.
APPLICATION FILED DEC. 18, 1902.
NO MODEL. 2 SHEETS—SHEET 1.
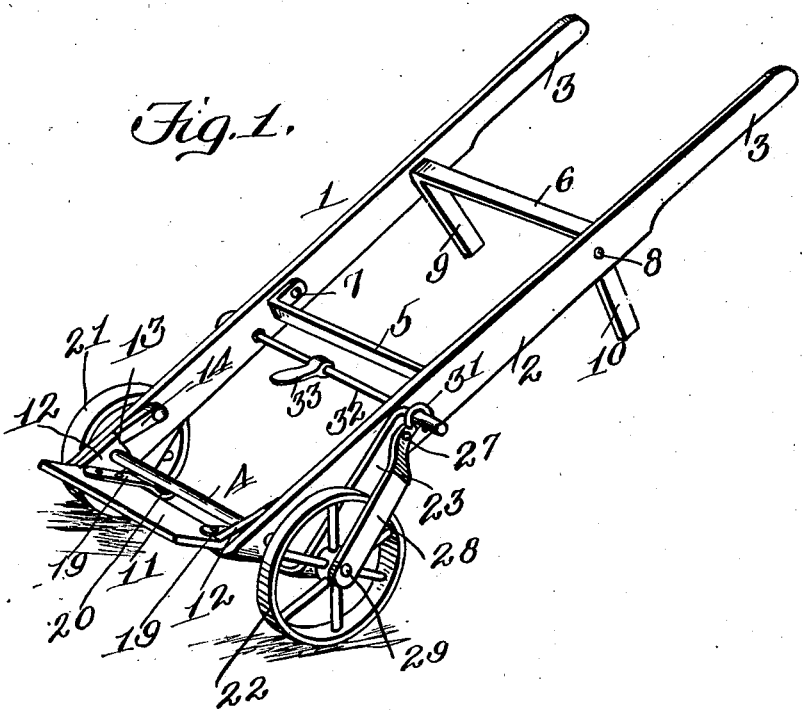

No. 722,570. PATENTED MAR. 10, 1903.
J. E. DILGER.
COMBINED TRUCK AND SKID.
APPLICATION FILED DEC. 18, 1902.
NO MODEL. 2 SHEETS—SHEET 2.

Witnesses:
C. D. Kesler.
James L. Norris, Jr.

Inventor
John E. Dilger
By James L. Norris
Atty.

UNITED STATES PATENT OFFICE.

JOHN E. DILGER, OF YANKTON, SOUTH DAKOTA.

COMBINED TRUCK AND SKID.

SPECIFICATION forming part of Letters Patent No. 722,570, dated March 10, 1903.

Application filed December 18, 1902. Serial No. 135,750. (No model.)

*To all whom it may concern:*

Be it known that I, JOHN E. DILGER, a citizen of the United States, residing at Yankton, in the county of Yankton and State of South Dakota, have invented new and useful Improvements in a Combined Truck and Skid, of which the following is a specification.

This invention relates to certain new and useful improvements in combined hand-trucks and skids.

The invention aims to provide a hand-truck adapted for moving objects from one point to another and which is so constructed that it may be easily adjusted in the form of a skid for the purpose of elevating or lowering objects.

The invention further aims to provide a combined hand-truck and skid which shall be extremely simple in its construction, strong, durable, efficient in its use, and comparatively inexpensive to manufacture.

With the above and other objects in view the invention consists of a novel combination and arrangement of parts hereinafter more specifically described, illustrated in the accompanying drawings, and particularly pointed out in the claims hereunto appended.

In describing the invention in detail reference is had to the accompanying drawings, forming a part of this specification, wherein like reference characters indicate corresponding parts throughout the several views, and in which—

Figure 4:
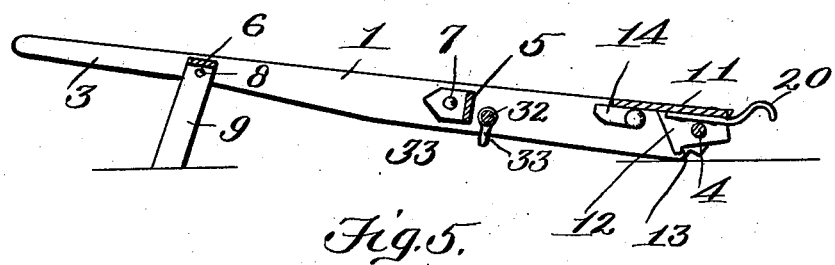
Figure 5:
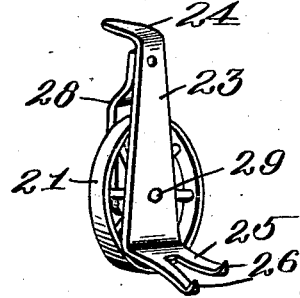

Figure 1 is a perspective view of the convertible truck and skid. Fig. 2 is a longitudinal sectional view thereof. Fig. 3 is a similar view to Fig. 1, wherein the truck is converted into a skid. Fig. 4 is a longitudinal sectional view of Fig. 3, and Fig. 5 is a detail view of one of the wheels of the truck and its connecting bearing-bracket.

Referring to the drawings by reference characters, the combination truck and skid is formed of a pair of longitudinally-extending side bars 1 2, one end of which terminates in the handle portion 3. The side bars 1 2 are suitably spaced apart and braced by means of the horizontally-extending brace-bars 4 5 6. The brace-bar 4 is in the form of a shaft and is rigidly connected to the forward end of the side bars 1 2. The brace-bar 5 is what is termed an "intermediate" brace-bar, and it is fixedly secured to the side bars, as at 7. The brace-bar 6 is fixedly secured to the side bars 1 2, as at 8, and it carries a pair of depending supporting-legs 9 10. The legs 9 10 in conjunction with the truck-wheels, hereinafter referred to, are adapted to retain the side bars 1 2 of the combined truck and skid off the ground or floor.

Mounted upon the brace-bar 4 at the forward end of the side bars 1 2 is the end plate or spade 11 of the truck and skid. This end plate or spade 11 is also termed the "skid-attaching" plate, and it is rotatably mounted upon the brace-bar 4 and when in position for use in connection with the truck projects above the side bars 1 2 and extends forwardly at an inclination. The plate 11 has each side formed with a rearwardly-extending apertured lug 12, through which extends the brace-bar 4, and the edge of each of these lugs is cut away to form a shoulder or stop 13, adapted to be engaged by the pawls or dogs 14, pivotally connected to the inner face of the side bars 1 2. The pawls or dogs 14 are adapted to engage the stops or shoulders 13, so as to arrest the rearward movement of the plate 11 when the latter is used in connection with the truck. The pawls or dogs 14 also retain the plate at an inclination, as shown in Fig. 1. The lugs 12 when mounted upon the brace-bar 4 are adapted to extend between the side bars 1 2. The lower edge of the plate 11 is cut away at an inclination, as at 15 16, forming thereby the shoulders 17 18. The cut-away portions 15 16 of the plate extend toward each other. Secured to the rear face of the plate 11, as at 19, is a pair of depending hooks 20. These hooks depend a suitable distance below the inclined portions 15 16 of the plate 11 and are termed "bearing-hooks" for the truck-wheels (the latter to be hereinafter referred to) and also "attaching-hooks" for the skid.

The reference characters 21 22 denote the truck-wheels, which are detachably connected to the side bars 1 2 and the bearing-hooks 20 by means of a pair of detachable bearing-brackets. Each of the bearing-brackets consists of a member 23, extending at an inclination and terminating at its upper end in an outwardly-extending lug 24 and at its lower end with an inwardly-extending fork 25.

The fork 25 is formed of a pair of tines, which may be termed "clamping-tines," and which extend at an inclination in opposite directions to each other and terminate at their ends in an inwardly-extending stud 26. Secured at its upper end, as at 27, to the outer face of the inclined member 23 is the keeper 28, which is bent outwardly at an inclination away from the member 23 and then extends the remaining portion of its length parallel with the member 23. The free end of the keeper 28 is connected to the bearing-stud 29. The latter is also secured to the member 23, and upon the bearing-stud is mounted one of the truck-wheels. When the brackets are in position for connecting the wheels to the truck, the upper end thereof is adapted to rest against an ear 30, secured, respectively, to the outer face of the side bars 1 2. The upper tine of the fork 25 is adapted to lie flush with its respective inclined portion of the plate 11, and the stud 26 is adapted to abut against its respective shoulder of the plate 11. The upper tine of the fork 25 engages the outer face of its respective hook 20, and the stud 26 of the upper tine engages the inner edge of its respective hook 20, or, in other words, the upper tine is adapted to embrace its respective hook 20 by contacting with its outer face and inner edge. The lower tine of the fork 25 engages the inner face of its respective hook 20, or, in other words, the lower tine of the fork 25 seats itself in the lower end of the hook 20, or, in other words, when the connecting-bracket is in position the forked end thereof is adapted to engage the inner and outer face of its respective hook. The brackets when in the position as hereinbefore mentioned are secured in such position by means of the hooked end 31 of the fastening-bar 32. The hooked ends of the fastening-bar 32 are adapted to engage the lugs 24 of the members 23. The fastening-bar 32 is loosely mounted in the side bars 1 2 and is provided centrally with the handle 33, so it can be grasped and released from its engagement with the lugs 24. When the fastening-bar 32 is rocked from its engagement with the lugs 24 of the members 23, the truck-wheels are readily detached from the hooks 20, and the remaining portion of the truck is converted into a skid by turning back the pawls or dogs 14 and then turning the plate 11 rearwardly until its movement is arrested by the pivoted end of the dogs or pawls 14, and it is then in parallelism with the said bars 1 2. The position of the plate will then be as shown in Fig. 3, the projecting end of the hooks being above the plane of the side bars 1 2 and the outer surface of the plate substantially in a plane with the top edges of the side bars 1 2. The hooks can then be attached to the point desired, so that the remaining portion of the structure will be used as a skid and an object can be lowered or elevated, as the case may be, or, in other words, be skidded up or down the side bars 1 2, as occasion requires. When the brackets carrying the truck-wheels are secured to the side bars 1 2, the rear ends thereof, which are engaged by the hooked ends of the fastening-bar, do not project above the top edge of the side bars 1 2; neither does the handle or grip carried by the fastening-bar. When the device is used as a skid, the legs 9 10 form a support therefor.

It is thought the many advantages of the combined hand-truck and convertible skid can be readily understood from the foregoing description, taken in connection with the accompanying drawings, and it will also be evident that the truck-wheels can be easily detached and used for transferring heavy bodies, if desired—that is to say, by supporting the body upon the forks of the brackets, the inclined member 23 then being in a vertical position and the lugs of the forks, which are sharp, engaging in the object to prevent it being dislodged from the fork—and it will furthermore be evident that changes, variations, and modifications can be resorted to without departing from the spirit of the invention or sacrificing any of its advantages, and I therefore do not wish to restrict myself to the details of construction hereinbefore described and as shown in the accompanying drawings, but reserve the right to make such changes, variations, and modifications as come properly within the scope of the protection prayed.

Having thus fully described my invention, what I claim as new, and desire to secure by Letters Patent, is—

1. In combination, a pair of side bars, a skid-attaching plate pivotally connected thereto, attaching-hooks carried by said plate, a pair of wheels, means adapted to engage with said hooks and said bars for supporting the wheels, and means for securing the said supporting means to the side bars.

2. A combined truck and convertible skid comprising in its construction a pair of wheels, and a bearing-bracket for each of said wheels provided with a fork and a lug.

3. A combined truck and convertible skid comprising in its construction a pair of side bars, an adjustable end plate pivotally connected thereto, and a pair of pawls adapted to engage the said end plate for limiting the movement of said plate.

4. A combined truck and convertible skid, consisting of a pair of side bars, an end plate pivotally connected thereto and provided with a pair of shoulders, a pair of hooks depending from said end plate, a bearing-bracket adapted to engage the said hooks and with the side bars, wheels carried by the said brackets, means carried by the said bars and engaging the said plate for limiting the movement thereof, and means carried by the side bars and engaging the brackets for detachably connecting them to the side bars.

5. A combined truck and convertible skid comprising in its construction a pivotal end plate having apertured lugs provided with shoulders, and its lower portion provided with a pair of shoulders, and a pair of hooks suitably depending from said plate.

6. A combined truck and convertible skid comprising in its construction a pair of side bars, a pivotal end plate, wheels detachably connected with said end plate and side bars, means for arresting the movement of said plate, and means carried by the side bars for detachably connecting said wheels therewith.

7. In a combined truck and skid, a longitudinally and angularly adjustable plate provided with attaching means, said plate when adjusted angularly adapted to form the spade of the truck and when adjusted longitudinally adapted to form a skid-attaching plate.

8. A combined truck and convertible skid comprising in its construction a pair of side bars, a pair of wheels, bearing-brackets suitably connected with the said side bars for supporting the said wheels, and a fastening-bar carried by the said side bars and engaging the bearing-brackets for detachably connecting them to the side bars.

9. A combined truck and convertible skid comprising in its construction a skid-connecting plate, supporting means therefor, bearing-brackets adapted to engage the said supporting means and said plate, means carried by the supporting means for detachably connecting the brackets thereto, and wheels mounted in the said brackets.

10. A combined truck and convertible skid comprising in its construction a skid-connecting plate, supporting means therefor, a pair of bearing-brackets engaging the said plate and said supporting means, a fastening-bar carried by the said supporting means and adapted to engage the said brackets for detachably connecting them to the said supporting means, and a wheel mounted in each of said brackets.

11. A combined truck and convertible skid comprising in its construction an adjustable skid-connecting plate, supporting means therefor, a pair of bearing-brackets engaging the said plate and said supporting means, a fastening-bar carried by the said supporting means and adapted to engage the said brackets for detachably connecting them to the said supporting means, and a wheel mounted in each of said brackets.

12. A combined truck and convertible skid comprising in its construction an adjustable skid-connecting plate, supporting means therefor, a pair of bearing-brackets adapted to engage the said plate and said supporting means, a wheel mounted in each of said brackets, a fastening-bar carried by the supporting means and adapted to engage the said brackets for detachably connecting them to said supporting means, and a pair of pawls carried by the supporting means adapted to engage the said plate for limiting the movement thereof.

In testimony whereof I have hereunto set my hand in presence of two subscribing witnesses.

JOHN E. DILGER.

Witnesses:
E. H. STONE,
C. W. TAYLOR.